(12) United States Patent
Xiang et al.

(10) Patent No.: US 11,372,163 B2
(45) Date of Patent: Jun. 28, 2022

(54) WAVELENGTH SWITCHING APPARATUS AND SYSTEM

(71) Applicant: HUAWEI TECHNOLOGIES CO., LTD., Shenzhen (CN)

(72) Inventors: Hui Xiang, Shenzhen (CN); Han Zhao, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/163,454

(22) Filed: Jan. 31, 2021

(65) Prior Publication Data
US 2021/0149118 A1 May 20, 2021

Related U.S. Application Data

(63) Continuation of application No. PCT/CN2019/097163, filed on Jul. 22, 2019.

(30) Foreign Application Priority Data

Jul. 31, 2018 (CN) .......................... 201810858949.3

(51) Int. Cl.
*G02B 6/293* (2006.01)
*G02B 27/30* (2006.01)

(52) U.S. Cl.
CPC ......... *G02B 6/29373* (2013.01); *G02B 27/30* (2013.01)

(58) Field of Classification Search
CPC .............................................. G02B 6/29373
See application file for complete search history.

(56) References Cited

U.S. PATENT DOCUMENTS

| 8,705,960 | B2 | 4/2014 | Colbourne |
| 10,133,005 | B2 * | 11/2018 | Yan ................... H04J 14/0212 |
| 2004/0156581 | A1 | 8/2004 | Golub et al. |
| 2012/0057869 | A1 | 3/2012 | Colbourne |
| 2013/0216183 | A1 | 8/2013 | Neilson et al. |

(Continued)

FOREIGN PATENT DOCUMENTS

| CN | 101667879 A | 3/2010 |
| CN | 102135644 A | 7/2011 |

(Continued)

OTHER PUBLICATIONS

Office Action issued in CN201810858949.3, dated May 11, 2021, 8 pages.

(Continued)

*Primary Examiner* — Sung H Pak

(57) ABSTRACT

A wavelength switching apparatus includes M input components, a first optical component, a first switch array, a second switch array, a second optical component, and K output components. The M input components include at least one local input component having N input ports, and a light beam input by the local input component can be converged, under an action of the first optical component, on a row of switch units that are in the first switch array and that are corresponding to the local input component. In this way, this is equivalent to further connecting an N*1-dimensional WSS to an input end of an M*K-dimensional WSS, so that the wavelength switching apparatus can integrate a wavelength adding function based on the M*K-dimensional WSS.

20 Claims, 10 Drawing Sheets

(56) References Cited

U.S. PATENT DOCUMENTS

| | | | |
|---|---|---|---|
| 2014/0205291 A1 | 7/2014 | Suzuki et al. | |
| 2018/0128984 A1 | 5/2018 | Yan et al. | |
| 2022/0052778 A1* | 2/2022 | Jia | G02B 6/27 |

FOREIGN PATENT DOCUMENTS

| | | |
|---|---|---|
| CN | 102696194 A | 9/2012 |
| CN | 108293155 A | 7/2018 |
| WO | 2015024238 A1 | 2/2015 |
| WO | 2017008208 A1 | 1/2017 |
| WO | 2017024428 A1 | 2/2017 |
| WO | 2017088115 A1 | 6/2017 |

OTHER PUBLICATIONS

International Search Report and Written Opinion issued in PCT/CN2019/097163, dated Oct. 22, 2019, 9 pages.

Uetsuka, Hisato et al., N×N Wavelength Selective Switches, 2016 21st Optoelectronics and Communications Conference (OECC) Held Jointly With 2016 International Conference on Photonics in Switching (PS), IEICE, 2016, XP032986246, 4 pages.

Yang, Haining et al., Stacked Wavelength Selective Switch Design for Low-cost CDC ROADMs , 2016 21St Optoelectronics and Communications Conference (OECC) Held Jointly With 2016 International Conference on Photonics in Switching (PS), IEICE, 2016, XP032985876, 4 pages.

Ikuma ,Yuichiro et al., Low-Loss Transponder Aggregator Using Spatial and Planar Optical Circuit, Journal of Lightwave Technology. IEEE, USA, vol. 34. No. 1, Jan. 1, 2016, XP011598923, 6 pages.

Nakajima, Mitsumasa et al., Multilane Photonic Spectral Processor Integrated in a Spatial and Planar Optical Circuit for a Space-Division Multiplexing Network, Journal of Lightwave Technology, IEEE, USA, vol. 36, No. 2, Jan. 15, 2018, XP011677780, 10 pages.

Extended European Search Report issued in EP 19844304.6 dated Jul. 22, 2021, 11 pages.

* cited by examiner

WAVELENGTH SWITCHING APPARATUS AND SYSTEM

CROSS-REFERENCE TO RELATED APPLICATIONS

This application is a continuation of International Application No. PCT/CN2019/097163, filed on Jul. 22, 2019, which claims priority to Chinese Patent Application No. 201810858949.3, filed on Jul. 31, 2018. The disclosures of the aforementioned applications are hereby incorporated by reference in their entireties.

TECHNICAL FIELD

This application relates to the field of optical communications technologies, and in particular, to a wavelength switching apparatus and system.

BACKGROUND

A reconfigurable optical add/drop multiplexer (reconfigurable optical add/drop multiplexer, ROADM) is an important optical switching node device in an optical network. After the ROADM is introduced, service reconstruction in a network line can be implemented to add/drop a service on a node. In this way, service scheduling in the optical network becomes more intelligent.

FIG. 1 is a schematic structural diagram of a typical ROADM in the prior art. As shown in FIG. 1, the ROADM includes a plurality of distributed 1×N wavelength selective switches (wavelength selective switch, WSS) and wavelength add/drop (add/drop, AD) modules, where the WSSs and the AD modules are connected to each other through a mesh; and supports pass-through or adding/dropping of wavelength services in M optical lines on a local node. For an optical signal that enters the ROADM from any dimension, the optical signal is first broadcast by an optical splitter to other dimensions and wavelength drop modules, and a locally dropped wavelength is selectively received by a client-side drop module by using a configured routing algorithm. A wavelength that needs to pass through the local node selectively passes through a corresponding WSS, while the wavelength does not pass through other WSSs. A wavelength that needs to be added on the local node selectively passes through a corresponding WSS after being added by a wavelength add module. It can be learned that, although a structure of the ROADM shown in FIG. 1 can implement wavelength switching between a plurality of dimensions, because the ROADM is constructed by discrete optical components and both a line side and a client side are implemented by WSSs, there are a large quantity of optical components with large sizes and quite high costs. In addition, as a node dimension increases, sizes and costs of the optical components further increase significantly. As a result, it is relatively difficult to perform maintenance.

SUMMARY

This application provides a wavelength switching apparatus and system, to reduce a size of a wavelength switching apparatus and improve integration.

According to a first aspect, an embodiment of this application provides a wavelength switching apparatus. In a direction from input to output of a light beam, the apparatus sequentially includes:

M input components, a first optical component, a first switch array, a second switch array, a second optical component, and K output components, where the first switch array and the second switch array each include a plurality of rows of switch units, and both M and K are positive integers greater than or equal to 1; at least one of the M input components is a local input component, the local input component is configured to receive a light beam added through an input port of the local input component, the local input component includes N input ports, N is a positive integer greater than or equal to 1, and each input component is configured to make a light beam input through an input port of the input component, incident to the first optical component; the first optical component is configured to converge, to a row of switch units that are in the first switch array and that are corresponding to each input component, a light beam incident from the input component; each row of switch units in the first switch array are configured to deflect a light sub-beam that is corresponding to each wavelength and that is in a light beam incident to the row of switch units, to a row of switch units that are in the second switch array and that are corresponding to an output component configured to output the light sub-beam; each row of switch units in the second switch array are configured to: deflect, based on a spatial location of an output component corresponding to the row of switch units, a light sub-beam that is corresponding to each wavelength and that is in a light beam incident to the row of switch units, and make the light sub-beam incident to the second optical component; the second optical component is configured to redirect, to an output component corresponding to each row of switch units in the second switch array, a light beam emergent from the row of switch units; and each of the K output components is configured to couple a light beam output by the output component into an output port for output.

It can be learned from the foregoing that, the wavelength switching apparatus provided in this embodiment of this application can implement a wavelength switching function in an M*K dimension by using the first switch array and the second switch array that are disposed. In other words, a wavelength input from any one of the M input components can be switched to any one of the K output components for output.

On this basis, because the M input components include at least one local input component having N input ports, and a light beam input by the local input component can be converged, under an action of the first optical component, on a row of switch units that are in the first switch array and that are corresponding to the local input component. In this way, this is equivalent to further connecting an N×1-dimensional WSS to an input end of an M*K-dimensional WSS, so that the wavelength switching apparatus provided in this embodiment of this application can integrate a wavelength adding function based on the M*K-dimensional WSS without separately connecting to an external wavelength add module. This effectively improves performance and integration of the wavelength switching apparatus and reduces a size of the wavelength switching apparatus.

In this embodiment of this application, there may be a plurality of possible implementations for the local input component. In a possible implementation, the local input component includes N input ports and a first lens group, where the first lens group is configured to: receive N light beams that are parallel to each other and that are emergent from the N input ports, converge the N light beams at a first space point, and make the N light beams incident to the first optical component at different angles.

In another possible implementation, the local input component includes N input ports and a first planar optical waveguide component connected to the N input ports, where the first planar optical waveguide component is configured to: receive N light beams input from the N input ports, and make the N light beams incident to the first optical component at different angles on a free-space emergent surface of the first planar optical waveguide component.

In a possible design, the M input components further include a line input component having one input port, where the line input component is configured to receive a light beam input by the line input component, and the line input component and the local input component are arranged in an alternating mode.

It can be learned from the foregoing that, compared with the line input component, the local input component occupies larger physical space in the wavelength switching apparatus. Therefore, in this embodiment of this application, the line input component and the local input component are arranged in an alternating mode, thereby effectively improving space utilization and integration of the wavelength switching apparatus and reducing a size of the wavelength switching apparatus.

In a possible design, at least one of the K output components is a local output component, the local output component is configured to drop a received light beam locally, and the local output component includes L output ports, where L is a positive integer greater than or equal to 1;

a row of switch units that are in the second switch array and that are corresponding to the local output component are configured to: deflect a light sub-beam that is corresponding to each wavelength and that is in a light beam incident to the row of switch units, based on a spatial location of an output port that is of the local output component and that is used to output the light sub-beam, and make the light sub-beam incident to the second optical component; and the second optical component is configured to redirect, to the local output component at different angles, light beams output through different output ports of the local output component.

In this embodiment of this application, the K output components may include the at least one local output component having L output ports, and each light sub-beam emergent from a row of switch units that are in the second switch array and that are corresponding to the local output component can be incident, under an action of the second optical component, to a corresponding output port of the local output component for output. In this way, the wavelength switching apparatus provided in this embodiment of this application can integrate a wavelength dropping function based on an M*K-dimensional WSS without separately connecting to an external wavelength add module. This effectively improves performance and integration of the wavelength switching apparatus and reduces a size of the wavelength switching apparatus.

Similarly, there may also be a plurality of possible implementations for the local output component provided in this embodiment of this application. In a possible implementation, the local output component includes L output ports and a second lens group, where the second lens group is configured to: receive L light beams emitted by the second optical component at different angles, convert the L light beams into L light beams parallel to each other, and make the parallel L light beams incident to the output ports of the local output component.

In another possible implementation, the local output component includes L output ports and a second planar optical waveguide component connected to the L output ports, where the second planar optical waveguide component is configured to: receive L light beams emitted by the second optical component at different angles, and output the L light beams to the output ports of the local output component.

In a possible design, the K output components further include a line output component having one output port, where the line output component is configured to output a received light beam to a line side, and the line output component and the local output component are arranged in an alternating mode.

It can be learned from the foregoing that, compared with the line output component, the local output component occupies larger physical space in the wavelength switching apparatus. Therefore, in this embodiment of this application, the line output component and the local output component are arranged in an alternating mode, thereby effectively improving space utilization and integration of the wavelength switching apparatus and reducing a size of the wavelength switching apparatus.

In a possible design, each input port in the M input components is connected to an input optical fiber, and a light beam transmitted in the input optical fiber is incident to the first optical component through the input port.

In a possible design, the first optical component includes a third lens group, a first dispersion element, and a fourth lens group, where the third lens group is configured to: redirect an incident light beam, and make the light beam incident to the first dispersion element; the first dispersion element is configured to disperse each incident light beam to obtain light sub-beams corresponding to wavelengths; and the fourth lens group is configured to converge, to the first switch array, the incident light sub-beams corresponding to the wavelengths, where light sub-beams corresponding to a same wavelength are converged on a column of switch units that are in the first switch array and that are corresponding to the wavelength.

In a possible design, the second optical component includes a seventh lens group, a second dispersion element, and an eighth lens group, where the seventh lens group is configured to: redirect a light sub-beam that is corresponding to each wavelength and that is emergent from the second switch array, and make the light sub-beam incident to the second dispersion element; the second dispersion element is configured to combine, into one light beam, light sub-beams that are in an incident light beam and that are corresponding to each output port; and the eighth lens group is configured to make a light beam that is in an incident light beam and that is corresponding to each output port incident to a corresponding output port.

In a possible design, each output port in the K output components is connected to an output optical fiber, and light beams incident to the output port are coupled into the output optical fiber for output.

According to a second aspect, an embodiment of this application provides another wavelength switching apparatus. In a direction from input to output of a light beam, the apparatus sequentially includes:

M input components, a first optical component, a first switch array, a second switch array, a second optical component, and K output components, where the first switch array and the second switch array each include a plurality of rows of switch units, and both M and K are positive integers greater than or equal to 1; each of the M input components is configured to input, to the first optical component, a light beam input through an input port of the input component; the first optical component is configured to converge, to a row of switch units that are in the first switch array and that are corresponding to each input component, a light beam incident from the input component; each row of switch units in the first switch array are configured to deflect a light sub-beam that is corresponding to each wavelength and that is in a light beam incident to the row of switch units, to a row of switch units that are in the second switch array and that are corresponding to an output component configured to output the light sub-beam; each row of switch units in the second switch array are configured to: deflect a light sub-beam that is corresponding to each wavelength and that is in a light beam incident to the row of switch units, based on a spatial location of an output port that is of an output component corresponding to the row of switch units and that is used to output the light sub-beam, and make the light sub-beam incident to the second optical component; the second optical component is configured to redirect, to an output component corresponding to each row of switch units in the second switch array, a light beam emergent from the row of switch units; and at least one of the K output components is the local output component, where the local output component is configured to drop a received light beam locally, the local output component includes L output ports, L is a positive integer greater than 1, and each output component is configured to couple light beams output by the output component into an output port for output.

It can be learned from the foregoing that, the wavelength switching apparatus provided in this embodiment of this application can implement a wavelength switching function in an M*K dimension by using the first switch array and the second switch array that are disposed. In other words, a wavelength input from any one of the M input components can be switched to any one of the K output components for output.

On this basis, because the K output components may include at least one local output component having L output ports, and each light sub-beam emergent from a row of switch units that are in the second switch array and that are corresponding to the local output component can be incident, under an action of the second optical component, to a corresponding output port of the local output component for output. In this way, the wavelength switching apparatus provided in this embodiment of this application can integrate a wavelength dropping function based on an M*K-dimensional WSS without separately connecting to an external wavelength add module. This effectively improves performance and integration of the wavelength switching apparatus and reduces a size of the wavelength switching apparatus.

There may also be a plurality of possible implementations for the local output component provided in this embodiment of this application. In a possible implementation, the local output component includes L output ports and a second lens group, where the second lens group is configured to: receive L light beams emitted by the second optical component at different angles, convert the L light beams into L light beams parallel to each other, and make the parallel L light beams incident to the output ports of the local output component.

In another possible implementation, the local output component includes L output ports and a second planar optical waveguide component connected to the L output ports, where the second planar optical waveguide component is configured to: receive L light beams emitted by the second optical component at different angles, and output the L light beams to the output ports of the local output component.

In a possible design, the K output components further include a line output component having one output port, where the line output component is configured to output a received light beam to a line side, and the line output component and the local output component are arranged in an alternating mode.

It can be learned from the foregoing that, compared with the line output component, the local output component occupies larger physical space in the wavelength switching apparatus. Therefore, in this embodiment of this application, the line output component and the local output component are arranged in an alternating mode, thereby effectively improving space utilization and integration of the wavelength switching apparatus and reducing a size of the wavelength switching apparatus.

In a possible design, each input port in the M input components is connected to an input optical fiber, and a light beam transmitted in the input optical fiber is incident to the first optical component through the input port.

In a possible design, the first optical component includes a third lens group, a first dispersion element, and a fourth lens group, where the third lens group is configured to: redirect an incident light beam, and make the light beam incident to the first dispersion element; the first dispersion element is configured to disperse each incident light beam to obtain light sub-beams corresponding to wavelengths; and the fourth lens group is configured to converge, to the first switch array, the incident light sub-beams corresponding to the wavelengths, where light sub-beams corresponding to a same wavelength are converged on a column of switch units that are in the first switch array and that are corresponding to the wavelength.

In a possible design, the second optical component includes a seventh lens group, a second dispersion element, and an eighth lens group, where the seventh lens group is configured to: redirect a light sub-beam that is corresponding to each wavelength and that is emergent from the second switch array, and make the light sub-beam incident to the second dispersion element; the second dispersion element is configured to combine, into one light beam, light sub-beams that are in an incident light beam and that are corresponding to each output port; and the eighth lens group is configured to make a light beam that is in an incident light beam and that is corresponding to each output port incident to a corresponding output port.

In a possible design, each output port in the K output components is connected to an output optical fiber, and light beams incident to the output port are coupled into the output optical fiber for output. According to a third aspect, an embodiment of this application further provides a wavelength switching system. The system includes:

M line selection components, K line receiving components, and at least two wavelength switching apparatuses according to the first aspect and any possible design of the first aspect or according to the second aspect and any possible design of the second aspect, where both M and K are positive integers greater than or equal to 1; each of the M line selection components is configured to allocate a received optical signal to a corresponding input component in each of the at least two wavelength switching apparatuses for input; each of the at least two wavelength switching apparatuses is configured to switch any wavelength in a light beam input by any input component of the wavelength switching apparatus, based on specified wavelength routing information to an output component that is corresponding to any wavelength and that is in the wavelength switching apparatus for output; and each of the K line receiving components is configured to obtain an output optical signal based on a light beam output by a corresponding output component of each of the at least two wavelength switching apparatuses.

It can be learned from the foregoing that, the wavelength switching system in this embodiment of this application may include the at least two wavelength switching apparatuses. In the wavelength switching system, at least one wavelength switching apparatus can work normally at one moment by using the line selection components and the line receiving components that are disposed. This greatly improves reliability of a wavelength switching node and supports a future market application of a wavelength division transport network.

DESCRIPTION OF EMBODIMENTS

To make the objectives, technical solutions, and advantages of this application clearer, the following further describes the embodiments of this application in detail with reference to the accompanying drawings. It should be noted that, terms used in an implementation part of this application are only used to explain specific embodiments of this application, but are not intended to limit this application.

It should be understood that, in the following description, terms such as "first" and "second" are only used for description differentiation, but cannot be understood as indication or implication of relative importance and cannot be understood as indication or implication of sequences.

A wavelength switching apparatus provided in the embodiments of this application may be a core node device having a wavelength switching function in an optical communications network. The wavelength switching apparatus may also be referred to as a ROADM, a wavelength cross-connect (wavelength crossconnect, WXC), an optical cross-connect (optical crossconnect, OXC), an optical switching node, a wavelength switching node, or the like. This is not specifically limited in the embodiments of this application.

The following describes in detail the embodiments of this application with reference to accompanying drawings.

Embodiment 1: M Input Components Include at Least One Local Input Component

Figure 1:
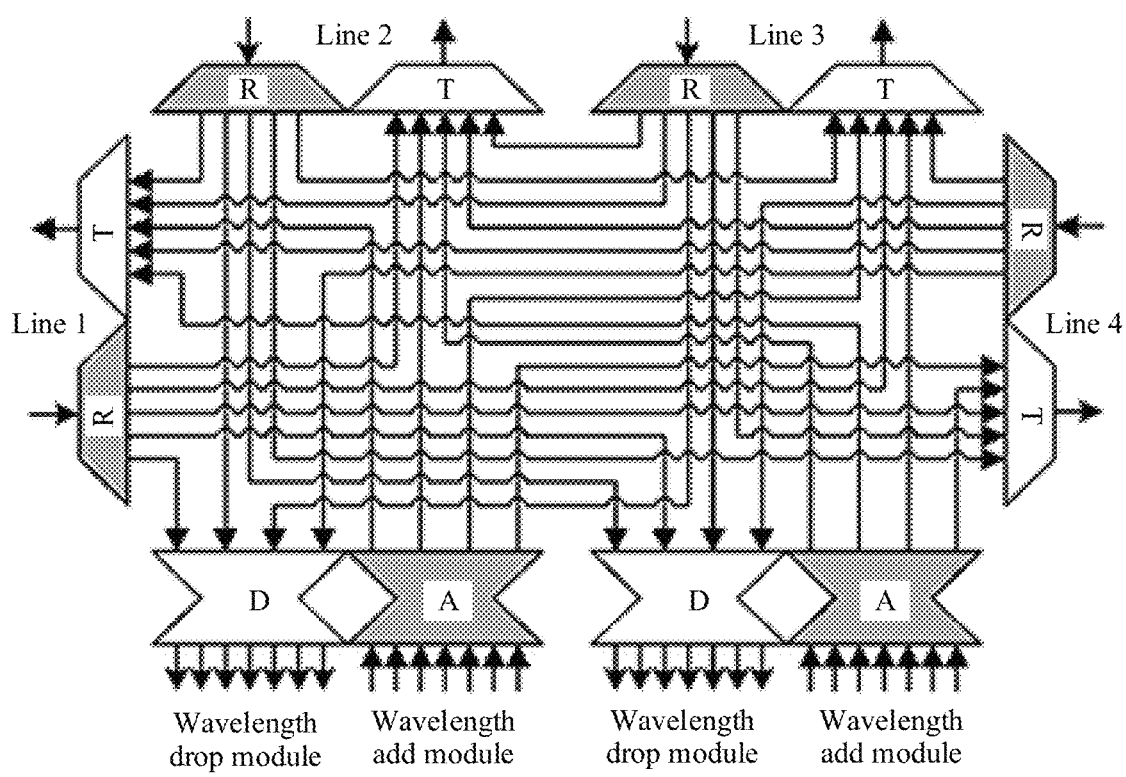
FIG. 1 is a schematic structural diagram of a ROADM in the prior art.
Figure 2:
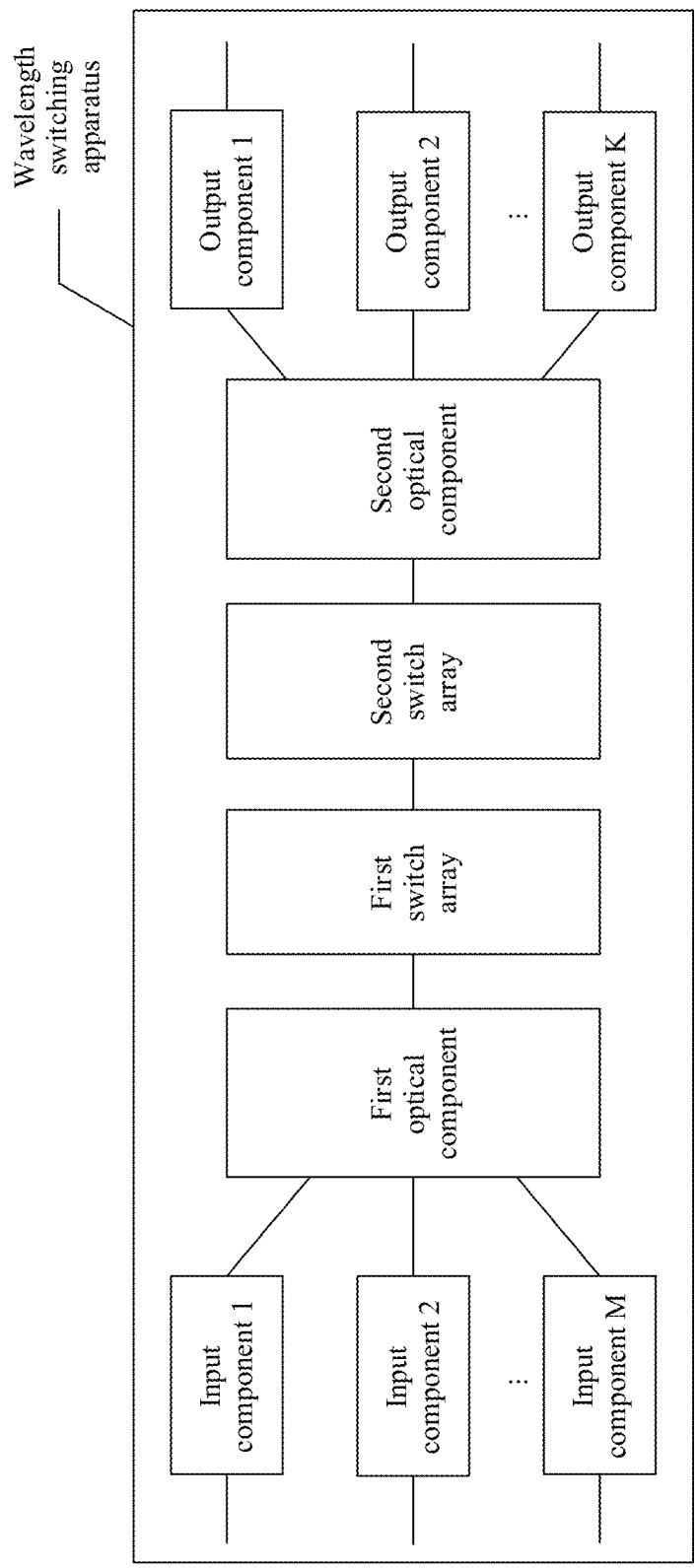
FIG. 2 is a schematic structural diagram of a wavelength switching apparatus according to an embodiment of this application.

FIG. 2 is a schematic structural diagram of a wavelength switching apparatus according to this application. As shown in FIG. 2, in a direction from input to output of a light beam, the apparatus sequentially includes M input components, a first optical component, a first switch array, a second switch array, a second optical component, and K output components, where both M and K are positive integers greater than or equal to 1, and values of M and K may be identical or different. This is not specifically limited in this embodiment of this application.

Each of the M input components includes an input port. A quantity of input ports included in the input component varies according to different types of input components. Specifically, there may be two types of input components in this embodiment of this application. One type of input component is a local input component including N input ports, where each input port is configured to: receive a light beam added from a local side (which is also referred to as a client side or a local dimension), and switch, by using the wavelength switching apparatus, each wavelength in the light beam to a corresponding output component for output. N is a positive integer greater than or equal to 1. The other type of input component is a line input component including one input port, where the input port is configured to: receive a light beam transmitted by another node on a line side (which is also referred to as a line dimension) in an optical network to a local node, and switch, by using the wavelength switching apparatus, each wavelength in the light beam to a corresponding output component for output. It should be noted that a light beam received through an input port of any one of the foregoing input components may be a light beam including a single wavelength (that is, monochromatic light), or may be a light beam including a plurality of wavelengths (that is, color light or polychromatic light). This is not specifically limited in this embodiment of this application.

Figure 3A:
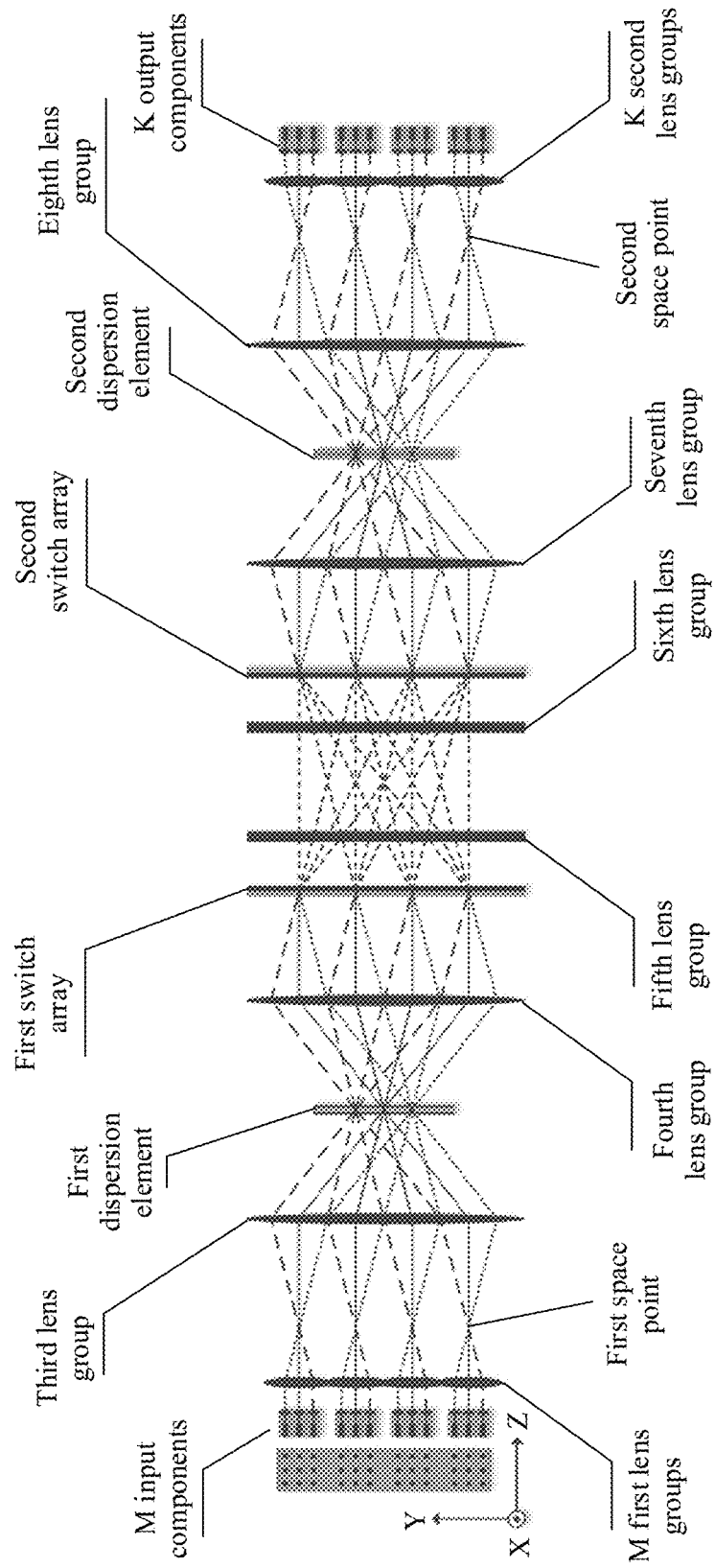
FIG. 3a is an optical path diagram of a wavelength switching apparatus on a port plane according to Embodiment 1 of this application.
Figure 3B:
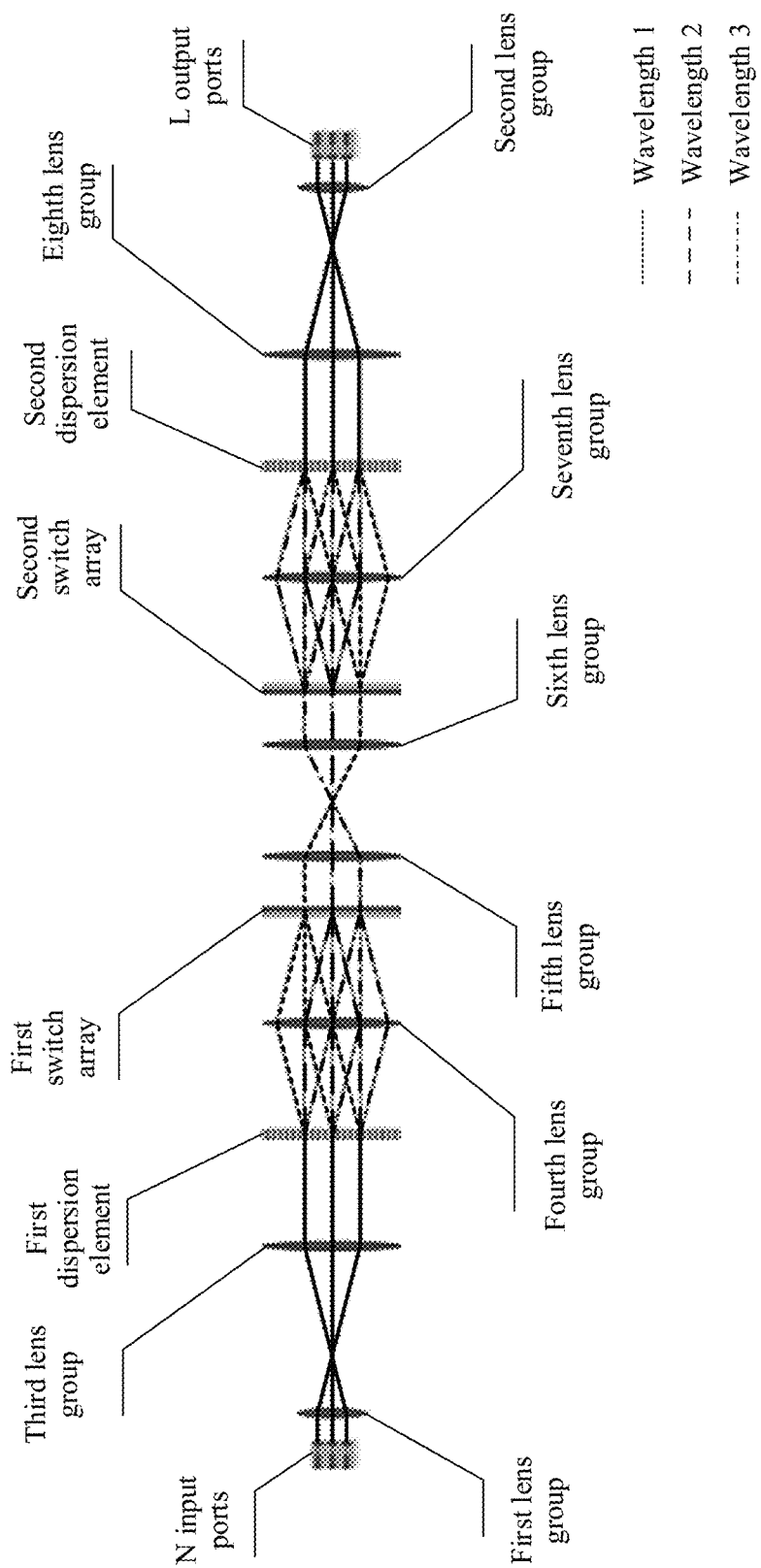
FIG. 3b is an optical path diagram of a wavelength switching apparatus on a wavelength plane according to Embodiment 1 of this application.

In this embodiment of this application, there may be a plurality of possible implementations for a structure of the input component. In a possible implementation, the local input component may include N input ports arranged in a one-dimensional or two-dimensional manner and a first lens group. FIG. 3a and FIG. 3b show examples of optical paths in a wavelength switching apparatus when a local input component uses a structure including N input ports and a first lens group. As shown in FIG. 3a and FIG. 3b, after being incident to the first lens group, N light beams that are parallel to each other and that are emergent from the N input ports are converged by the first lens group at a first space point (the first space point is an image-space focus of the first lens group), and further light beams input from different input ports are incident to a first optical component from the first space point at different angles. In contrast, a line input component (not shown in FIG. 3a and FIG. 3b) includes only one input port, and a light beam emergent from the input port is directly incident to the first optical component.

Specifically, in this implementation, each input port may be connected to one input optical fiber, and a light beam transmitted in the input optical fiber is incident to the first lens group through the input port. Because the light beam is propagated in free space after entering the wavelength switching apparatus through the input optical fiber, to avoid severe optical power attenuation resulting from excessive divergence of the light beam during free-space propagation, the input optical fiber may further be provided with a corresponding collimation device configured to collimate the light beam entering the free space. Therefore, the light beam entering the wavelength switching apparatus through the input optical fiber is first incident to the corresponding collimation device, and then is incident to the first lens group after being collimated.

Figure 4:
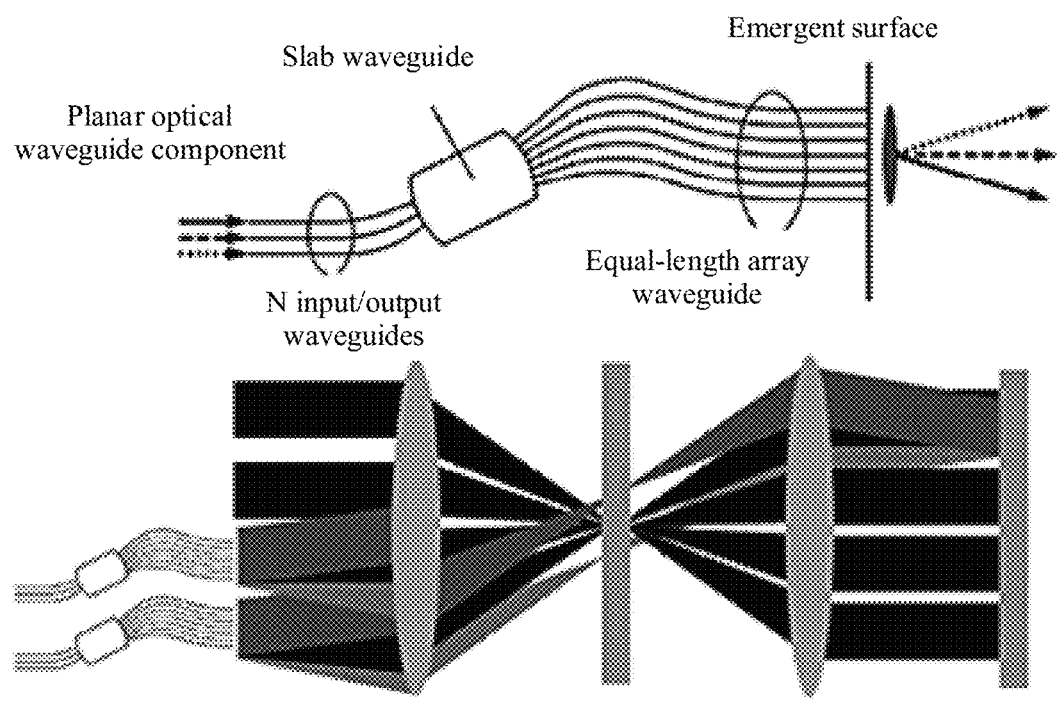
FIG. 4 is a schematic structural diagram of a planar optical waveguide component according to Embodiment 1 of this application.

In another possible implementation, the local input component may include N input ports and a first planar optical waveguide component connected to the N input ports, and the first planar optical waveguide component may specifically be a planar lightwave circuit (planar lightwave circuit, PLC) lens. FIG. 4 shows an example of a structure of the first planar optical waveguide component. As shown in FIG. 4, the first planar optical waveguide may include N input/output waveguides (I/O waveguides), a slab slab waveguide (slab waveguide) area, and a plurality of arrayed waveguides (arrayed waveguides) with an equal length, where N is a positive integer greater than or equal to 1.

Specifically, in this implementation, each input port may be connected to one input optical fiber. In this way, that the first planar optical waveguide component is connected to the N input ports essentially means that the N input/output waveguides in the first planar optical waveguide component are connected to the N input optical fibers, respectively. In other words, in this implementation, one input/output waveguide in the first planar optical waveguide component matches one input port, and a quantity of input/output waveguides is the same as a quantity of input ports of the local input component and both the quantities are N. However, it should be noted that a quantity of arrayed waveguides in the first planar optical waveguide is not specifically limited in this embodiment of this application.

Figure 5A:
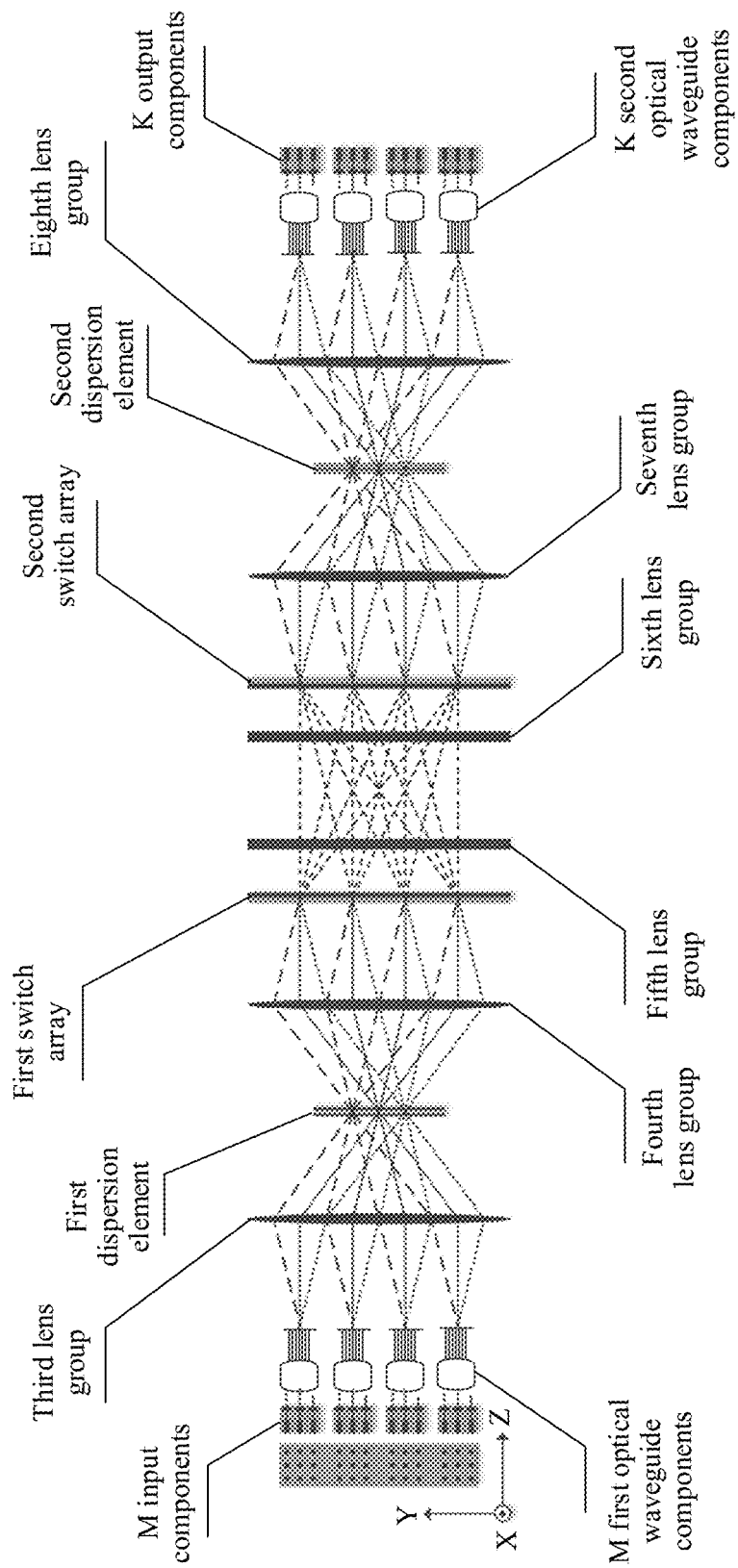
FIG. 5a is an optical path diagram of another wavelength switching apparatus on a port plane according to Embodiment 1 of this application.
Figure 5B:
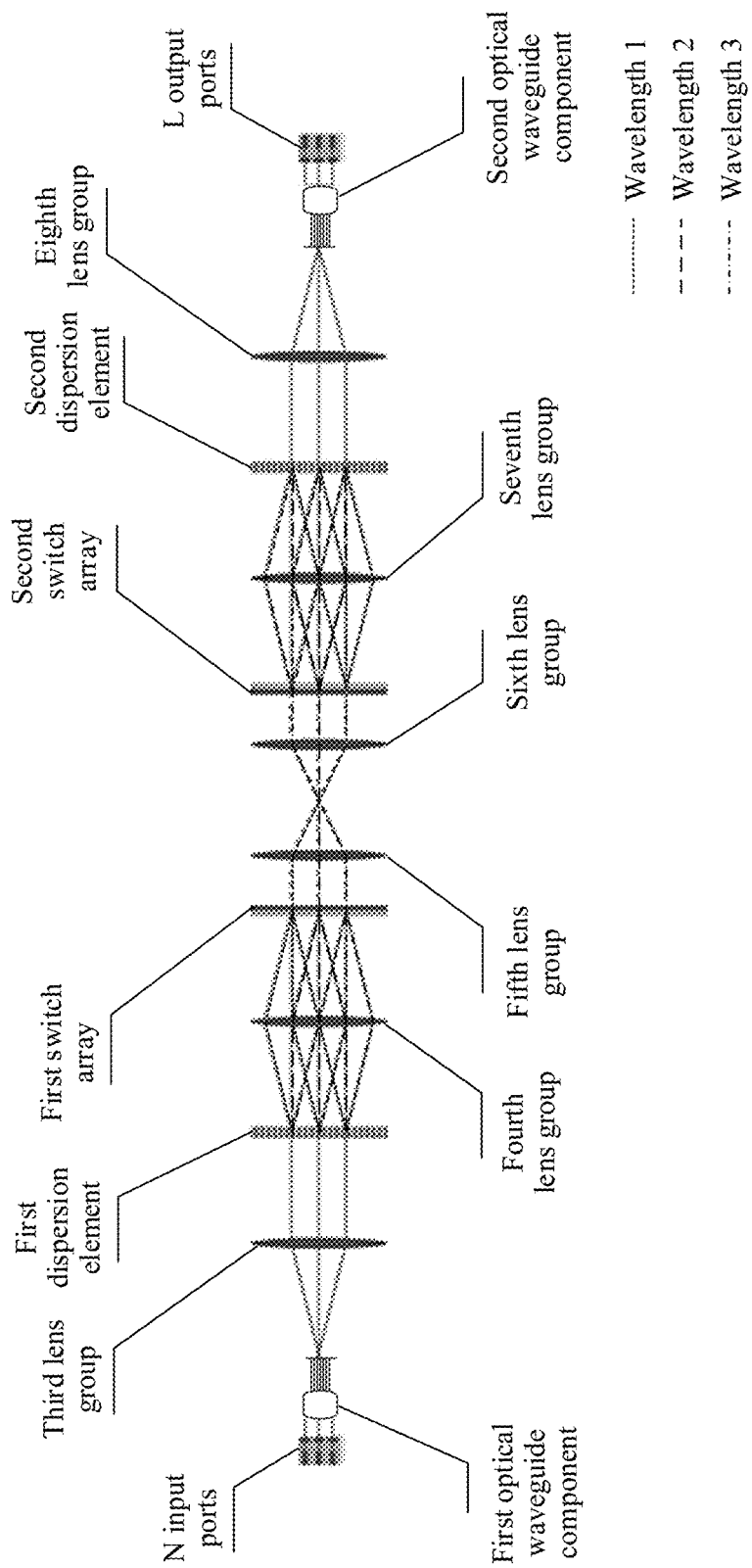
FIG. 5b is an optical path diagram of another wavelength switching apparatus on a wavelength plane according to Embodiment 1 of this application.

FIG. 5a and FIG. 5b show examples of optical paths in a wavelength switching apparatus when a local input component uses a structure including a first planar optical waveguide component. With reference to FIG. 5a and FIG. 5b, N light beams input from N input ports of the local input component first enter corresponding N input/output waveguides, enter a slab waveguide area at different locations, are incident to arrayed waveguides with an equal length based on different phase planes, and finally are incident to a first optical component at different angles on a free-space emergent surface of the arrayed waveguides. In contrast, after being collimated, a light beam input from an input port of a line input component may directly be incident to the first optical component.

It can be learned that, the first planar optical waveguide component can implement a function similar to that of the first lens group in the foregoing implementation of the local input component, that is, making the N light beams that are input from the N input ports of the local input component incident to the first optical component at a same emergent point at different angles, the N light beams input from the N input ports of the local input component. Specifically, when the first lens group is applied, the same emergent point is an image space focus of the first lens group (that is, the first space point in the foregoing description). When the first planar optical waveguide component is applied, the same emergent point is an emergent point of a light beam on a free-space emergent surface of the first planar optical waveguide component.

Compared with application of the first lens group, the first planar optical waveguide component in this implementation is easier to be integrated, and a plurality of planar optical waveguide components in array arrangement, which may also be referred to as a planar optical waveguide component array, can directly be implemented by using a planar optical waveguide process. This effectively reduces a size of the wavelength switching apparatus, improves integration, and avoids an unnecessary optical loss of a light beam in free space when the first lens group is applied. In addition, a limitation imposed by the first lens group on a quantity of input ports can further be eliminated by applying the planar optical waveguide component, so that more input ports can be supported and performance of the wavelength switching apparatus on a local side can be enhanced.

It should be noted that, in this embodiment of this application, the M input components may include at least one local input component, and an input component other than the local input component is a line input component. In other words, the wavelength switching apparatus provided in this embodiment of this application definitely includes a local input component, but may include or may not include a line input component. This is not specifically limited. For example, all the M input components may be local input components; or some input components may be local input components, and the other input components may be line input components.

In an example, FIG. 3a and FIG. 5a each show only four local input components, and each local input component includes nine input ports evenly arranged in three rows and three columns. However, it should be understood that, quantities of local input components and line input components are not specifically limited in this embodiment of this application. A person skilled in the art can specifically set the quantities of local input components and line input components in the wavelength switching apparatus depending on a networking requirement of the wavelength switching apparatus. Similarly, in this embodiment of this application, quantities (that is, values of N) and arrangement manners of input ports of different local input components may be identical or different. This is not specifically limited in this embodiment of this application. For example, a local input component may include four input ports, where the four input ports may be arranged in a two-dimensional manner of two rows and two columns. Another local input component may include six input ports, where the six input ports may be arranged in two rows and three columns or in three rows and two columns. Alternatively, another local input component may include three input ports, where the three input ports are arranged in a one-dimensional manner in a vertical direction.

During subsequent wavelength switching, to effectively distinguish between light beams input by different input components, the M input components in this embodiment of this application may be arranged in a one-dimensional manner in a direction perpendicular to a diffracted light plane (that is, on a dispersion plane of the diffracted light) of a dispersion element (for example, a grating) in a subsequent optical path. For example, if the dispersion element disperses an incident light beam on a horizontal plane, the M input components may be arranged in a one-dimensional manner in a vertical direction, and light beams input by different input components may be incident to different rows of the first switch array. In this way, the light beams input by the different input components may be distinguished based on locations at which the light beams are incident to the first switch array. It should be noted that, in actual application, the M input components may not be strictly required to be arranged in a one-dimensional manner in a direction perpendicular to a diffracted light plane. Specifically, if the first lens group is applied to a local input component, it is strictly required that first space points corresponding to local input components in the M input components (that is, image-space focuses of the first lens group in all the local input components) be arranged in a one-dimensional manner in a direction perpendicular to a diffracted light plane. Similarly, if a first planar optical waveguide component is applied to a local input component, it is strictly required that emergent points on free-light-space emergent surfaces of planar optical waveguide components in local input components of the M input components be arranged in a one-dimensional manner in a direction perpendicular to a diffracted light plane of a dispersion element in a subsequent optical path. In this way, an effect the same as that of arranging the M input components in a one-dimensional direction can also be achieved.

Figure 6:
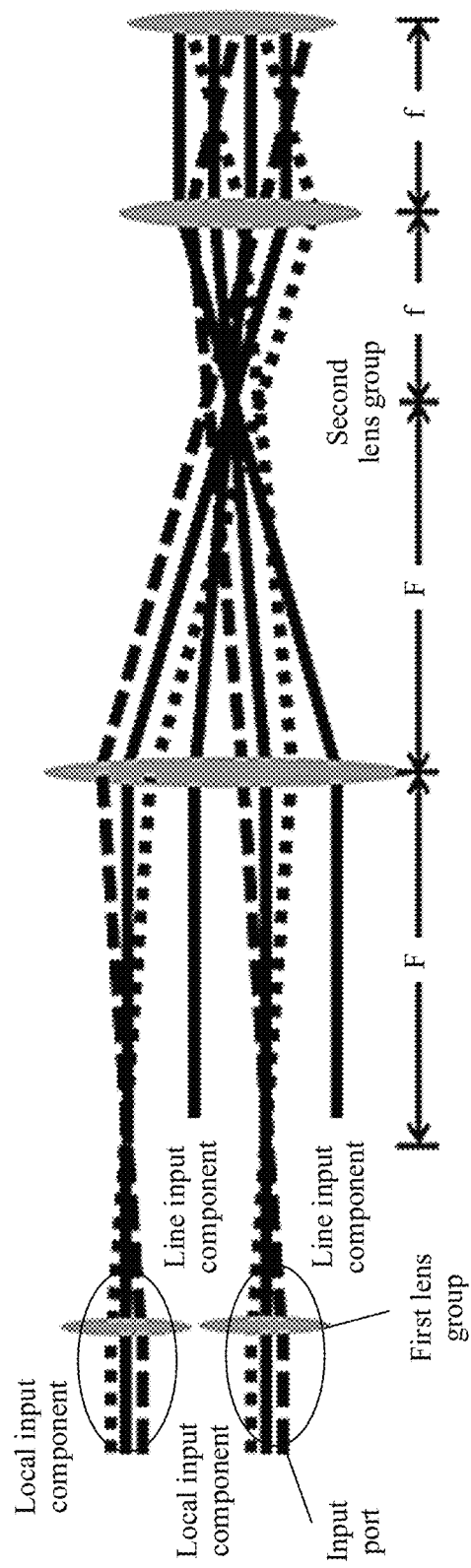
FIG. 6 is a schematic diagram illustrating that local input components and line input components in a wavelength switching apparatus are arranged at intervals according to Embodiment 1 of this application.

If the M input components include both a local input component and a line input component, considering that the local input component further includes the first lens group, compared with the line input component, the local input component occupies larger physical space. Therefore, in this embodiment of this application, alternatively, local input components and line input components may be arranged at intervals on a basis of one-dimensional arrangement of the M input components, as shown in FIG. 6. In this way, integration of the wavelength switching apparatus can be effectively improved, a size of the wavelength switching apparatus can be reduced, and difficulty in overall spatial design of the apparatus caused because the first lens group in each local input component occupies relatively large space can be avoided. It should be noted that FIG. 6 illustrates distribution locations of two types of input components only from a perspective of an optical path, but does not show various parts: an input optical fiber, an input port, and a collimator. However, it should be understood that these constituent parts are included in an actual optical system.

For example, in a possible design, the M input components may include M/2 local input components and M/2 line input components, where one of the local input components is disposed adjacent to one of the line input components. Therefore, from an overall perspective, the local input components and the line input components in the M input components are disposed in an alternating mode. It should be noted that in this example, it is not strictly required that M be an even number and that a quantity of local input components have to be equal to a quantity of line input components. It means that the quantity of local input components is roughly equal to the quantity of line input components, that is, the quantities may be equal, a difference between the quantities may be 1, or there may be another difference in a relatively small range between the quantities.

As described above, each of the M input components is configured to input, to the first optical component, a light beam input through an input port of the input component. Referring to FIG. 3*a* and FIG. 3*b* or FIG. 5*a* and FIG. 5*b*, the first optical component in this embodiment of this application may include three parts: a third lens group, a first dispersion element, and a fourth lens group. A light beam input from an input port of each input component is first incident to the third lens group in the first optical component, is redirected by the third lens group, and then is incident to the first dispersion element. The first dispersion element performs dispersion on each incident light beam, so that light sub-beams corresponding to different wavelengths in a same light beam are emergent in different directions. Finally, the light sub-beams corresponding to the wavelengths are converged on the first switch array after being redirected by the fourth lens group. Light sub-beams corresponding to wavelengths from a same input component may be converged on a same row of switch units in the first switch array.

Specifically, for each local input component of the M input components, the local input component includes N input ports. When the first lens group is applied to the local input component, light beams input from the N input ports are first converged at a first space point (that is, an image space focus of the first lens group), and then are incident to the third lens group from the first space point in different directions. When a planar optical waveguide component is applied to the local input component, light beams input from the N input ports are incident to the third lens group from an emergent point on a free-space emergent surface of a first planar optical waveguide component in different directions. Therefore, in this embodiment of this application, an image-space focus of the first lens group in each local input component or each emergent point on the free-space emergent surface of the first planar optical waveguide component is located on an object-space focal plane of the third lens group. In this way, referring to FIG. 3*a* and FIG. 5*a*, after passing through a second lens group, N light beams emergent from the input ports of the local input component may be converted into N light beams parallel to each other, and the N parallel light beams are incident to the first dispersion element.

In a possible design, the first dispersion element may be a first grating. FIG. 3*b* and FIG. 5*b* show examples of optical paths, on a wavelength plane, of light beams input by input components. As shown in FIG. 3*b* or FIG. 5*b*, for each light beam incident to the first grating, based on a diffraction effect of the grating, the first grating enables different wavelengths in the light beam to be emergent at different angles, to obtain light sub-beams corresponding to the wavelengths in the light beam. In FIG. 3*b* and FIG. 5*b*, different types of dashed lines respectively represent light sub-beams of different wavelengths obtained through dispersion of a same light beam. The light sub-beams may be converged on the first switch array after being incident to the fourth lens group and being redirected by the fourth lens group. Herein, it should be noted that, to enable the fourth lens group to implement an optimal light beam redirection function, the light sub-beams corresponding to the wavelengths can be accurately converged at corresponding locations on the first switch array after passing through the fourth lens group, and the first grating may be located on an object-space focal plane of the fourth lens group, while the first switch array may be located on an image-space focal plane of the fourth lens group.

It should be noted that, because each input port in the M input components inputs a light beam to the first grating, after dispersion performed on the light beam by the first grating, when being emergent, the light beam is converted into light sub-beams of wavelengths whose quantity is equal to a quantity of wavelengths originally included in the light beam. Considering that quantities of wavelengths included in light beams input through different input ports may be identical or different, quantities of light sub-beams obtained through dispersion of different light beams are not specifically limited in this embodiment of this application.

In this embodiment of this application, the first switch array and the second switch array each may include a plurality of switch units in matrix arrangement. Specifically, because of redirection of the third lens group and the fourth lens group in the first optical component and dispersion of the first grating, a light beam input by each of the M input components may be converged on a row of switch units in the first switch array, and light sub-beams corresponding to different wavelengths in the light beam may be converged on different columns of the row of switch units. To be specific, after each light beam input through an input port of the M input components passes through the first grating, each light beam is divided into independent light sub-beams in space based on wavelengths; and among the light sub-beams, light sub-beams from a same input component are converged on a same row of switch units in the first switch array, and light sub-beams of a same wavelength are converged on a same column of switch units in the first switch array. Therefore, it can also be understood that one row of switch units in the first switch array are corresponding to one of the M input components, and one column of switch units are corresponding to one wavelength in a light beam input to the wavelength switching apparatus through an input port of the M input components.

To implement a wavelength switching function of the wavelength switching apparatus, a row of switch units in the first switch array may be configured to: independently deflect a light sub-beam that is corresponding to each wavelength and that is incident to the row of switch units, and deflect, based on specified wavelength routing configuration information, each light sub-beam to a row of switch units that are in the second switch array and that are corresponding to an output component configured to output the light sub-beam.

Specifically, in this embodiment of this application, each switch unit in the first switch array may independently deflect a light sub-beam incident to the switch unit. For example, the first switch array may include switch units with M rows and X columns, where a switch unit located in an $i^{th}$ row and a $j^{th}$ column is configured to independently deflect a light sub-beam incident to the switch unit. Because the light sub-beam is in effect a light sub-beam that is corresponding to a wavelength j and that is in a light beam input from an $i^{th}$ input component of the M input components, if it is specified in the wavelength routing configuration information that the wavelength j input from the $i^{th}$ input component is output by a $k^{th}$ output component of K output components, the switch unit in the $i^{th}$ row and the $j^{th}$ column of the first switch array may deflect the light sub-beam to a switch unit in a $k^{th}$ row and a $j^{th}$ column of the second switch array, that is, a switch unit that is specifically corresponding to a wavelength k and that is in a row of switch units, in the second switch array, corresponding to the $k^{th}$ output component of the K output components. In this example, X may be a maximum quantity of wavelengths used in the wavelength switching apparatus, i is a positive integer greater than or equal to 1 and less than or equal to M, j is a positive integer greater than or equal to 1 and less than or equal to X, and k is a positive integer greater than or equal to 1 and less than or equal to K.

Similarly, in this embodiment of this application, each row of switch units in the second switch array may also independently deflect a light sub-beam that is corresponding to each wavelength and that is incident to the row of switch units, and make, based on a spatial location of an output component corresponding to the row of switch units, each light sub-beam incident to the second optical component according to a corresponding deflection angle, so that after being redirected by the second optical component, each light sub-beam can be coupled into a corresponding output component for output. It should be noted that, in this embodiment of this application, the second switch array may include switch units with K rows and X columns, where one row of switch units are corresponding to one of the K output components, and one column of switch units are corresponding to one wavelength in a light beam input to the wavelength switching apparatus through an input port of the M input components. In this way, an output component corresponding to a row of switch units is an output component configured to output a light sub-beam that is corresponding to each wavelength and that is incident to the row of switch units.

It can be learned that, light sub-beams that are corresponding to wavelengths and that are incident to a same row of switch units in the second switch array are all light sub-beams output by a same output component. However, because the wavelengths are different, the light sub-beams are incident to switch units in different columns of the row of switch units, and incident angles of the light sub-beams may be identical or different. Therefore, each switch unit in the second switch array may also independently deflect a light sub-beam incident to the switch unit. Details are not described herein again.

In this embodiment of this application, the first switch array and the second switch array may be implemented by using a liquid crystal on silicon (liquid crystal on silicon, LCoS) technology, a micro-electro-mechanical system (micro-electro-mechanical system, MEMS) array, or another type of switching engine technology. This is not specifically limited in this embodiment of this application.

In a possible design, as shown in FIG. 3a and FIG. 3b or FIG. 5a and FIG. 5b, a fifth lens group and a sixth lens group symmetrically disposed may further be included between the first switch array and the second switch array, and are configured to redirect light sub-beams switched in the first switch array and the second switch array, to avoid a loss caused by excessive divergence of each light sub-beam in a propagation process. It should be noted that, in this embodiment of this application, the first switch array may be located on an object-space focal plane of the fifth lens group, the second switch array may be located on an image-space focal plane of the sixth lens group, and a focal length of the fifth lens group may be the same as a focal length of the sixth lens group.

Further, after being emergent from the second switch array, a light sub-beam corresponding to each wavelength is incident to the second optical component. Referring to FIG. 3a and FIG. 3b or FIG. 5a and FIG. 5b, the second optical component in this embodiment of this application includes three parts: a seventh lens group, a second dispersion element, and an eighth lens group, and is configured to redirect, to an output component corresponding to each row of switch units in the second switch array, a light beam emergent from the row of switch units.

Specifically, in this embodiment of this application, the second switch array may be located on an object-space focal plane of the seventh lens group, the second dispersion element may be a second grating, and the second grating may be located on an image-space focal plane of the seventh lens group. A light beam emergent from a row of switch units in the second switch array may include light sub-beams corresponding to a plurality of wavelengths, and the row of switch units specifically deflect, based on a spatial location of a corresponding output component, the light sub-beams that are corresponding to the wavelengths and that are output by the output component. Therefore, from a perspective of a port plane, when the output component does not include a plurality of output ports, deflection angles of the light sub-beams corresponding to the wavelengths are the same. From a perspective of a wavelength plane, as shown in FIG. 3b or FIG. 5b, the light sub-beams corresponding to the wavelengths are parallel to each other after being emergent from the row of switch units in the second switch array, and are converged at a same location on the second grating after being redirected by the seventh lens group. Further, due to a reverse dispersion effect of the second grating, the light sub-beams of the wavelengths are combined into one beam (that is, monochromatic light of the wavelengths is combined into one color light beam), and after being redirected by the eighth lens group, the light beam is finally incident to the output component corresponding to the row of the switch units.

Similar to the input component, there may be two types of output components in this embodiment of this application. One type of output component is a local output component including L output ports, where the output port is configured to drop each wavelength in a received light beam locally (that is, a local dimension or a client side), and L is a positive integer greater than 1. The other type of output component is a line output component including one output port, where the output port is configured to: output each wavelength in a received light beam to a line side (that is, a line dimension), and continue transmitting the wavelength to another node in an optical communications network, where each wavelength in the light beam output to the line side may be from a locally added light beam, or may be from a light beam input by a line input component from the line side. It should be noted that a light beam output through an output port of any one of the foregoing output components may be a light beam including a single wavelength (that is, monochromatic light), or may be a light beam including a plurality of wavelengths (that is, color light or polychromatic light). This is not specifically limited in this embodiment of this application.

In this embodiment of this application, the K output components may not include a local output component, and all the output components are line output components; or may include at least one local output component, and an output component other than the at least one local output component is a line output component. It should be noted that, because the M input components in this embodiment of this application include at least one local input component, the K output components also certainly include at least one line output component, configured to continue transmitting, to another node in the optical communications network, each wavelength added by the at least one local input component. Similarly, if the K output components include at least one local output component, the M input components definitely include at least one line input component, configured to receive a light beam transmitted in the line dimension from another node in the optical communications network to a local node. Certainly, each wavelength input to the wavelength switching apparatus by the line input component in the M input components may be locally dropped by the local output component, or may continue being transmitted to another node in the optical communications network by the line input component. This may specifically be determined based on wavelength routing configuration information configured in the wavelength switching apparatus. This is not specifically limited in this embodiment of this application.

Using an output component in the K output components as an example, if the output component is a line output component, after a row of switch units that are in the second switch array and that are corresponding to the line output component emits, according to a spatial location of the line output component, a light sub-beam that is corresponding to each wavelength and that is incident to the row of switch units, the emergent light sub-beams corresponding to the wavelengths are converged by the seventh lens group at a same location on the second grating; under an action of the second grating, the light sub-beams are combined into one light beam; and after being redirected by the eighth lens group, the light beam is finally coupled into an output port of the line output component for output.

If the output component is a local output component, a row of switch units that are in the second switch array and that are corresponding to the local output component may independently deflect, based on a spatial location of an output port that outputs each light sub-beam, a light sub-beam that is corresponding to each wavelength and that is incident to the row of switch units. Because the second switch array is located on the object-space focal plane of the seventh lens group, from the perspective of the port plane, after passing through the seventh lens group, light sub-beams output through different output ports are converted into light beams parallel to each other, and the parallel light beams are converged at different locations on the second grating. After being diffracted by the second grating, light sub-beams output through a same output port are combined into one light beam (that is, monochromatic light of wavelengths output through a same output port is combined into one color light beam), and after being redirected by the eighth lens group, L parallel light beams are finally coupled into the corresponding output ports for output, respectively.

Specifically, there may alternatively be a plurality of possible implementations for the local output component in this embodiment of this application. In a possible implementation, the local output component may include L output ports arranged in a one-dimensional or two-dimensional manner and a second lens group. In this implementation, as shown in FIG. 3a and FIG. 3b, the eighth lens group may converge, at a second space point, a light beam output through each output port in a local output component, where the second space point may be an object-space focus of the second lens group. In this way, the light beams output through the output ports are incident to the second lens group from the second space point in different directions, and after passing through the second lens group, the light beams are converted into a plurality of light beams parallel to each other, and the parallel light beams are respectively coupled into corresponding output ports.

In another possible implementation, the local output component may include a second planar optical waveguide component and L output ports connected to the second planar optical waveguide component. The second planar optical waveguide component has a structure similar to that of the foregoing first planar optical waveguide component. Details are not described herein again. In this implementation, as shown in FIG. 5a and FIG. 5b, the eighth lens group may converge, at a same point on a free-space emergent surface of the second planar optical waveguide component, light beams output through output ports of a local output component. In this way, the light beams output through the output ports may be coupled into arrayed waveguides with an equal length in the second planar optical waveguide component, and the light beams are input, through L input/output waveguides, to corresponding output components for output.

In this embodiment of this application, each output port may include one output optical fiber. When the second lens group is applied to the local output component, to enable a light beam output through an output port to be efficiently coupled into the output optical fiber from free space, each output optical fiber may further be provided with a corresponding collimation lens. Therefore, the light beam output through the output port is first incident to the collimation lens from the second lens group, and then is coupled into the optical fiber. When the second planar optical waveguide component is applied to the local output component, L output optical fibers of the local output component are correspondingly connected to the L input/output waveguides in the second planar optical waveguide component, respectively.

It should be noted that the K output components in this embodiment of this application may alternatively be arranged in a one-dimensional manner in a same direction as the M input components. In a possible design, if the K output components include both a local output component and a line output component, the local output component and the line output component may alternatively be arranged in an alternating mode on a basis of one-dimensional arrangement of the K output components, to improve integration of the wavelength switching apparatus and reduce a size of the wavelength switching apparatus. For example, the K output components may include K/2 local output components and K/2 line output components, where one of the local output components is disposed adjacent to one line output component. Therefore, from an overall perspective, the local output components and the line output components in the K input components are disposed in an alternating mode. It should be noted that in this example, similarly, K is not strictly limited to an even number, and a quantity of local output components may be equal to a quantity of line output components, a difference between the quantities may be 1, or there may be another difference in a relatively small range between the quantities.

In an example, FIG. 3a and FIG. 5a each show only four local input components, and each local output component includes nine output ports evenly arranged in three rows and three columns. However, it should be understood that, the quantities of local output components and line output components are not specifically limited in this embodiment of this application. A person skilled in the art can specifically set the quantities of local output components and line output components in the wavelength switching apparatus depending on a networking requirement of the wavelength switching apparatus. Similarly, in this embodiment of this application, quantities (that is, values of L) and arrangement manners of output ports of different local output components may be identical or different. This is not specifically limited in this embodiment of this application.

It should be noted that, in the wavelength switching apparatuses shown in FIG. 3a, FIG. 3b, FIG. 5a, and FIG. 5b, the first grating, the second grating, the first switch array, and the second switch array are all transmission-type optical elements. However, it should be understood that, the foregoing structure is only an example provided in this embodiment of this application. In actual application, optical elements such as a grating and a switch array in the wavelength switching apparatus may be transmission-type optical elements or may be reflection-type optical elements. This is not specifically limited in this embodiment of this application.

The wavelength switching apparatus provided in this embodiment of the present invention includes constituent parts such as the M input components, the first optical component, the first switch array, the second switch array, the second optical component, and the K output components, where the first switch array may deflect a light sub-beam that is corresponding to each wavelength and that is in a light beam incident to any one row of switch units in the first switch array, to a row of switch units that are in the second switch array and that are corresponding to an output component configured to output the light sub-beam; and the second switch array may deflect, based on a spatial location of an output component corresponding to any one row of switch units in the second switch, a light sub-beam that is corresponding to each wavelength and that is in a beam incident to the row of switch units, so that after being redirected, each light sub-beam can be finally coupled into a corresponding output component for output. It can be learned from the foregoing that, the wavelength switching apparatus provided in this embodiment of this application can implement a wavelength switching function in an M*K dimension by using the first switch array and the second switch array that are disposed. In other words, a wavelength input from any one of the M input components can be switched to any one of the K output components for output.

Figure 7:
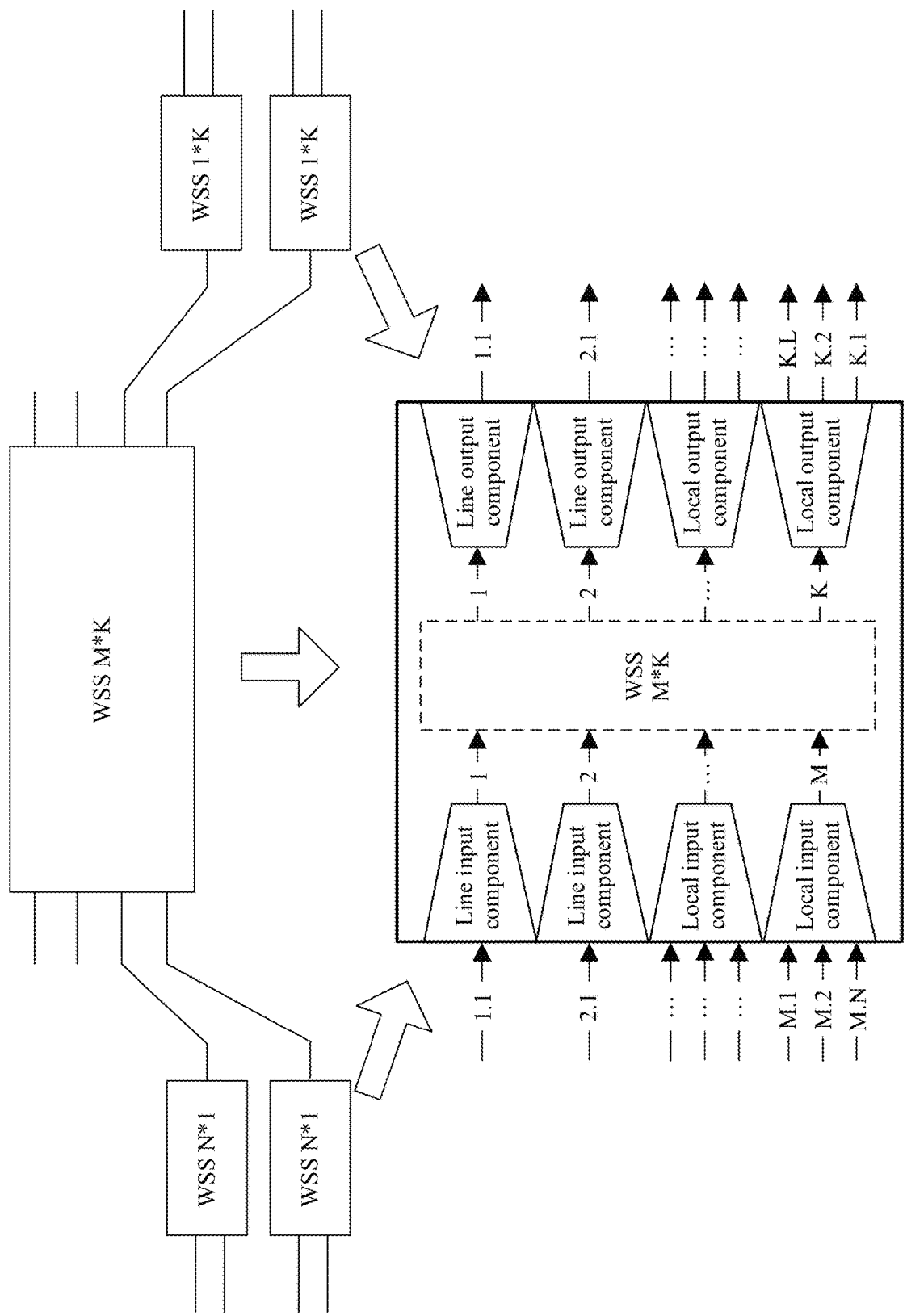
FIG. 7 is a schematic modular diagram of a wavelength switching apparatus according to an embodiment of this application.

On this basis, because the M input components include at least one local input component having N input ports, and a light beam input by the local input component can be converged, under an action of the first optical component, on a row of switch units that are in the first switch array and that are corresponding to the local input component. In this way, this is equivalent to further connecting an N×1-dimensional WSS to an input end of an M*K-dimensional WSS, so that the wavelength switching apparatus provided in this embodiment of this application can integrate a wavelength adding function based on the M*K-dimensional WSS. FIG. 7 is a schematic modular diagram of a wavelength switching apparatus according to an embodiment of this application. With reference to FIG. 7, a local input component is disposed in the wavelength switching apparatus without separately connecting to an external wavelength add module, to effectively avoid a technical problem that an entire optical system has relatively poor performance due to a relatively large quantity of relatively complex components when a wavelength switching module is externally provided with a wavelength add module, improve performance and integration of the wavelength switching apparatus, and reduce a size of the wavelength switching apparatus.

The K output components in this embodiment of this application may include at least one local output component having L output ports, and each light sub-beam emergent from a row of switch units that are in the second switch array and that are corresponding to the local output component can be incident, under an action of the second optical component, to a corresponding output port of the local output component for output. In this way, the wavelength switching apparatus provided in this embodiment of this application can integrate a wavelength dropping function based on an M*K-dimensional WSS. As shown in FIG. 7, the local output component is disposed in the wavelength switching apparatus without separately connecting to an external wavelength add module, to effectively avoid a technical problem that an entire optical system has relatively poor performance due to a relatively large quantity of relatively complex components when a wavelength switching module is externally provided with a wavelength drop module, improve performance and integration of the wavelength switching apparatus, and reduce a size of the wavelength switching apparatus.

In addition, the first switch array and the second switch array in the wavelength switching apparatus in this embodiment of this application specifically select, based on preset wavelength routing configuration information, corresponding output ports for wavelengths in a light beam input through any input port. In this embodiment of this application, wavelength routing configuration information in any one switch array can be dynamically set by a person skilled in the art depending on a networking requirement, a service requirement, and the like of an optical switching node, to implement a flexible and reconfigurable wavelength switching function.

Embodiment 2: An Output Component Includes at Least One Local Output Component

Embodiment 2 of this application provides another wavelength switching apparatus. The wavelength switching apparatus also has the structure shown in FIG. 2. To be specific, in a direction from input to output of a light beam, the wavelength switching apparatus sequentially includes M input components, a first optical component, a first switch array, a second switch array, a second optical component, and K output components.

However, compared with Embodiment 1 of this application, the K output components in Embodiment 2 of this application include at least one local output component, and an output component in the K output components other than the at least one local output component is a line output component. Because the K output components include at least one local output component, the M input components certainly include at least one line input component. In addition to the line input component, the M input components may include or may not include a local input component. This is not specifically limited in this embodiment of this application. Certainly, alternatively, in the K output components, all the output components may be local output components without a line output component included. This is not specifically limited in this embodiment of this application.

Referring to FIG. 3a and FIG. 3b or FIG. 5a and FIG. 5b, a specific implementation of the wavelength switching apparatus in Embodiment 2 of this application may be the same as that described in Embodiment 1. Details are not described herein again.

Embodiment 3: Wavelength Switching System Having a Redundancy Backup Function

Figure 8:
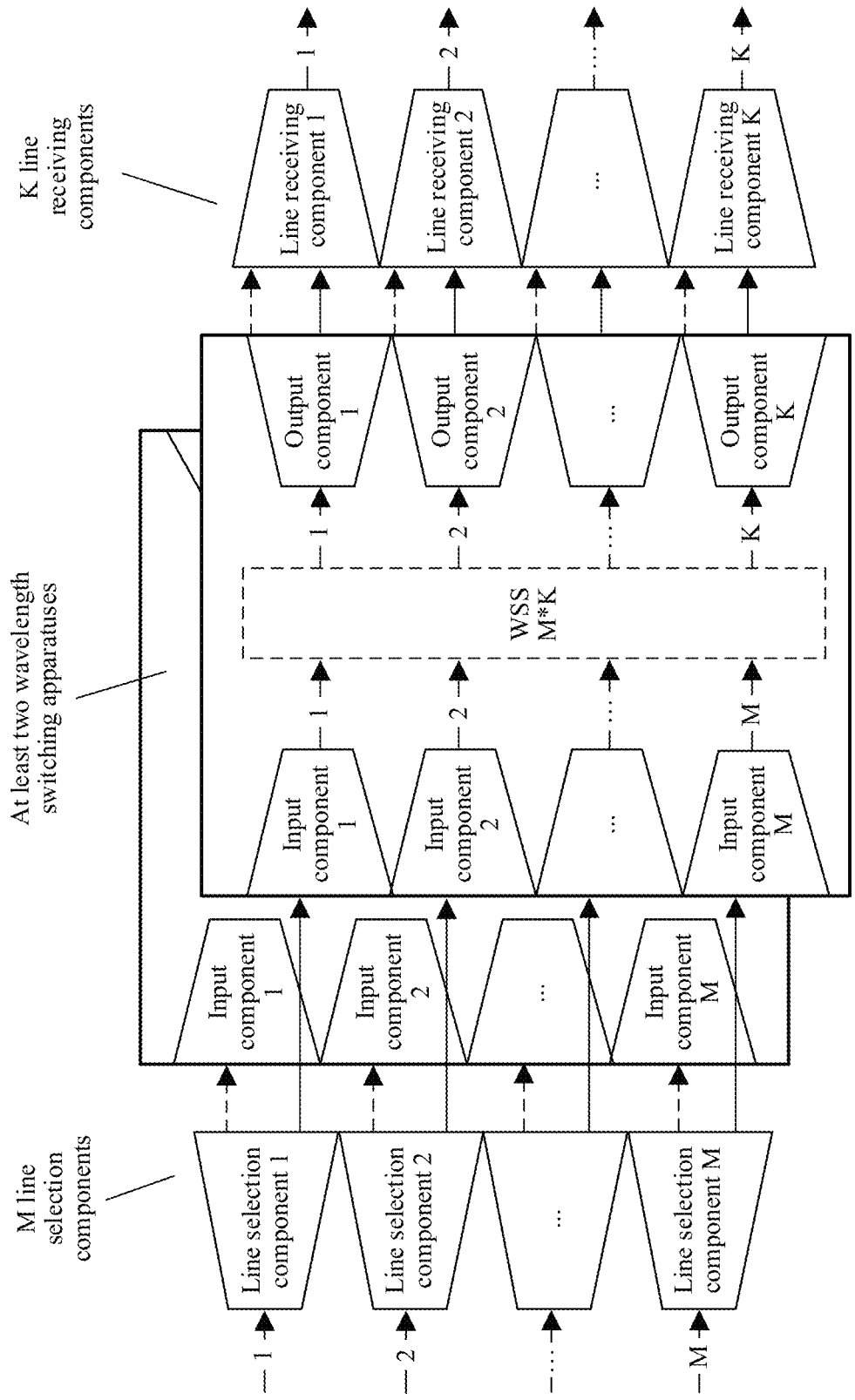
FIG. 8 is a schematic structural diagram of a wavelength switching system according to Embodiment 3 of this application.

Embodiment 3 of this application provides a wavelength switching system. FIG. 8 is an example of a schematic structural diagram of the wavelength switching system. As shown in FIG. 8, the system includes M line selection components, K line receiving components, and at least two wavelength switching apparatuses provided in any possible design of Embodiment 1 of this application or Embodiment 2 of this application, where both M and K are positive integers greater than or equal to 1.

In this embodiment of this application, each of the foregoing at least two wavelength switching apparatuses may be a wavelength switching apparatus having M input components and K output components. Correspondingly, each of the M line selection components may be connected to a corresponding input component in each wavelength switching apparatus, and each of the K line receiving components may be connected to a corresponding output component in each wavelength switching apparatus.

Specifically, each of the M line selection components may allocate, according to a specific proportion, received optical signals to corresponding input components in the wavelength switching apparatuses for input. It should be noted that the proportion may be a power proportion of light sub-beams input into the wavelength switching apparatuses. The line selection component may evenly allocate optical signal power to the wavelength switching apparatuses, or may allocate all optical signal power to only one of the wavelength switching apparatuses. This is not specifically limited in this embodiment of this application. For example, if the wavelength switching system includes two wavelength switching apparatuses: a wavelength switching apparatus 1 and a wavelength switching apparatus 2, a line selection component 1 in the M line selection components may be connected to both an input component 1 in the wavelength switching apparatus 1 and an input component 1 in the wavelength switching apparatus 2, and input received optical signals to the two input components 1 according to a specific proportion.

Each of the at least two wavelength switching apparatuses may switch, based on specified wavelength routing configuration information, any wavelength in a light beam input by any input component in the wavelength switching apparatus, to an output component that is corresponding to the wavelength and that is in the wavelength switching apparatus for output. Each of the K line receiving components may obtain an output optical signal based on a light beam output by a corresponding output component in each wavelength switching apparatus.

In this embodiment of this application, there may be a plurality of possible implementations for the line selection component. In a possible implementation, the line selection component may be an optical splitter, configured to support concurrent work of the at least two wavelength switching apparatuses. In this case, the wavelength switching apparatuses in the wavelength switching system can work simultaneously. For example, if the wavelength switching system includes two wavelength switching apparatuses, an input light beam may be split into two light sub-beams by using an optical splitter, power of all the light sub-beams is the same, and the light sub-beams are respectively input to the two wavelength switching apparatuses by corresponding input components for wavelength switching.

Correspondingly, in this case, the line receiving component may be an optical switch, configured to select one of outputs corresponding to the at least two wavelength switching apparatuses as an output of the wavelength switching system. In this way, generally, each wavelength switching apparatus in the system works normally. In this case, the line receiving component may select a default output from outputs from output components corresponding to the wavelength switching apparatuses as the output of the wavelength switching system. In case of emergency, if a currently selected wavelength switching apparatus becomes abnormal, the line receiving component may switch the output of the system to another wavelength switching apparatus that works normally. In this way, the at least two wavelength switching apparatuses are disposed in the wavelength switching system, so that the wavelength switching system can further have a redundancy backup function in addition to a wavelength switching function. This effectively improves reliability of the wavelength switching system and ensures that the wavelength switching system always works normally without being shut down.

In another possible implementation, the line selection component may alternatively be an optical switch, configured to support selective transmission performed by the at least two wavelength switching apparatuses. In this case, in the wavelength switching system, only one of the wavelength switching apparatuses is in a working state at one moment, a wavelength switching apparatus that is to be in a working state may be selected by using the optical switch, and switching to the wavelength switching apparatus that is to be in a working state is performed in the wavelength switching apparatuses in the wavelength switching system. Correspondingly, in this case, the line receiving component may be an optical switch or a coupler, configured to select, from the at least two wavelength switching apparatuses, an output of the wavelength switching apparatus that is in a working state as the system output. In this way, in case of emergency, if a wavelength switching apparatus that is originally in a working state becomes abnormal, switching the wavelength switching apparatus that is in a working state to another wavelength switching apparatus in the system may be performed by using the line selection component. In this way, the at least two wavelength switching apparatuses are disposed in the wavelength switching system, so that the wavelength switching system can further have a redundancy backup function in addition to a wavelength switching function. This effectively improves reliability of the wavelength switching system and ensures that the wavelength switching system always works normally without being shut down.

It should be noted that the at least two wavelength switching apparatuses in this embodiment of this application may be the same. This can be understood as follows. In one aspect, wavelength routing configuration information of the wavelength switching apparatuses in the wavelength switching system is the same. In this way, the wavelength switching apparatuses in the system may have a same wavelength switching function. When the wavelength switching apparatuses input a same light beam, outputs of the wavelength switching apparatuses are also the same. In another aspect, the wavelength switching apparatuses in the wavelength switching system have a same structure, and the structure may be the same as the structure of the wavelength switching apparatus provided in Embodiment 1 of this application or the structure of the wavelength switching apparatus provided in Embodiment 2 of this application. In this way, the wavelength switching apparatuses in the wavelength switching system can also have same performance, and even in case of emergency and switching needs to be performed between a plurality of wavelength switching apparatuses, it can still be ensured that the output of the wavelength switching system is stable without being affected by an external environment.

It can be learned from the foregoing that, the wavelength switching system in this embodiment of this application may include the at least two wavelength switching apparatuses. In the wavelength switching system, at least one wavelength switching apparatus can work normally at one moment by using the line selection components and the line receiving components that are disposed. This greatly improves reliability of a wavelength switching node and supports a future market application of a wavelength division transport network.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, an optical memory, and the like) that include computer-usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Obviously, a person skilled in the art can make various modifications and variations to this application without departing from the scope of this application. This application is intended to cover these modifications and variations of this application provided that they fall within the scope of protection defined by the following claims and their equivalent technologies.

What is claimed is:

1. A wavelength switching apparatus, wherein in an incident-to-emergent light beam direction, the apparatus sequentially comprises: M input components, a first optical component, a first switch array, a second switch array, a second optical component, and K output components, wherein the first switch array and the second switch array each comprise a plurality of rows of switch units, and both M and K are positive integers greater than or equal to 1;

at least one of the M input components is a local input component, the local input component is configured to receive a light beam added through an input port of the local input component, the local input component comprises N input ports, N is a positive integer greater than or equal to 1, and each input component is configured to make a light beam input through an input port of the input component, incident to the first optical component;

the first optical component is configured to converge, to a row of switch units that are in the first switch array and that are corresponding to each input component, a light beam incident from the input component;

each row of switch units in the first switch array are configured to deflect a light sub-beam that is corresponding to each wavelength and that is in a light beam incident to the row of switch units, to a row of switch units that are in the second switch array and that are corresponding to an output component configured to output the light sub-beam;

each row of switch units in the second switch array are configured to: deflect, based on a spatial location of an output component corresponding to the row of switch units, a light sub-beam that is corresponding to each wavelength and that is in a light beam incident to the row of switch units, and make the light sub-beam incident to the second optical component;

the second optical component is configured to redirect, to an output component corresponding to each row of switch units in the second switch array, a light beam emergent from the row of switch units; and each of the K output components is configured to couple a light beam output by the output component into an output port for output.

2. The apparatus according to claim 1, wherein the local input component further comprises a first lens group, wherein the first lens group is configured to: receive N light beams that are parallel to each other and that are emergent from the N input ports, converge the N light beams at a first space point, and make the N light beams incident to the first optical component at different angles.

3. The apparatus according to claim 1, wherein the local input component further comprises a first planar optical waveguide component connected to the N input ports, wherein the first planar optical waveguide component is configured to: receive N light beams input from the N input ports, and make the N light beams incident to the first optical component at different angles on a free-space emergent surface of the first planar optical waveguide component.

4. The apparatus according to claim 1, wherein the M input components further comprise a line input component having one input port, wherein the line input component is configured to receive a light beam input by the line input component, and the line input component and the local input component are arranged in an alternating mode.

5. The apparatus according to claim 1, wherein at least one of the K output components is a local output component, the local output component is configured to drop a received light beam locally, and the local output component comprises L output ports, wherein L is a positive integer greater than or equal to 1;

a row of switch units that are in the second switch array and that are corresponding to the local output component are configured to: deflect a light sub-beam that is corresponding to each wavelength and that is in a light beam incident to the row of switch units, based on a spatial location of an output port that is of the local output component and that is used to output the light sub-beam, and make the light sub-beam incident to the second optical component; and the second optical component is configured to redirect, to the local output component at different angles, light beams output through different output ports of the local output component.

6. The apparatus according to claim 5, wherein the local output component further comprises a second lens group, wherein the second lens group is configured to: receive L light beams emitted by the second optical component at different angles, convert the L light beams into L light beams parallel to each other, and make the parallel L light beams incident to the output ports of the local output component.

7. The apparatus according to claim 5, wherein the local output component further comprises a second planar optical waveguide component connected to the L output ports, wherein the second planar optical waveguide component is configured to: receive L light beams emitted by the second optical component at different angles, and output the L light beams to the output ports of the local output component.

8. The apparatus according to claim 5, wherein the K output components further comprise a line output component having one output port, wherein the line output component is configured to output a received light beam to a line side, and the line output component and the local output component are arranged in an alternating mode.

9. The apparatus according to claim 1, wherein each input port in the M input components is connected to an input optical fiber, and a light beam transmitted in the input optical fiber is incident to the first optical component through the input port.

10. The apparatus according to claim 9, wherein the first optical component comprises a third lens group, a first dispersion element, and a fourth lens group, wherein the third lens group is configured to: redirect an incident light beam, and make the light beam incident to the first dispersion element; the first dispersion element is configured to disperse each incident light beam to obtain light sub-beams corresponding to wavelengths; and the fourth lens group is configured to converge, to the first switch array, the incident light sub-beams corresponding to the wavelengths, wherein light sub-beams corresponding to a same wavelength are converged on a column of switch units that are in the first switch array and that are corresponding to the wavelength.

11. The apparatus according to claim 9, wherein the second optical component comprises a seventh lens group, a second dispersion element, and an eighth lens group, wherein the seventh lens group is configured to: redirect a light sub-beam that is corresponding to each wavelength and that is emergent from the second switch array, and make the light sub-beam incident to the second dispersion element; the second dispersion element is configured to combine, into one light beam, light sub-beams that are in an incident light beam and that are corresponding to each output port; and the eighth lens group is configured to make a light beam that is in an incident light beam and that is corresponding to each output port incident to a corresponding output port.

12. The apparatus according to claim 1, wherein each output port in the K output components is connected to an output optical fiber, and light beams incident to the output port are coupled into the output optical fiber for output.

13. A wavelength switching apparatus, wherein in an incident-to-emergent light beam direction, the apparatus sequentially comprises: M input components, a first optical component, a first switch array, a second switch array, a second optical component, and K output components, wherein the first switch array and the second switch array each comprise a plurality of rows of switch units, and both M and K are positive integers greater than or equal to 1;

each of the M input components is configured to make, a light beam input through an input port of the input component, incident to the first optical component;

the first optical component is configured to converge, to a row of switch units that are in the first switch array and that are corresponding to each input component, a light beam incident from the input component;

each row of switch units in the first switch array are configured to deflect a light sub-beam that is corresponding to each wavelength and that is in a light beam incident to the row of switch units, to a row of switch units that are in the second switch array and that are corresponding to an output component configured to output the light sub-beam;

each row of switch units in the second switch array are configured to: deflect a light sub-beam that is corresponding to each wavelength and that is in a light beam incident to the row of switch units, based on a spatial location of an output port that is of an output component corresponding to the row of switch units and that is used to output the light sub-beam, and make the light sub-beam incident to the second optical component;

the second optical component is configured to redirect, to an output component corresponding to each row of switch units in the second switch array, a light beam emergent from the row of switch units; and at least one of the K output components is the local output component, wherein the local output component is configured to drop a received light beam locally, the local output component comprises L output ports, L is a positive integer greater than 1, and each output component is configured to couple light beams output by the output component into an output port for output.

14. The apparatus according to claim 13, wherein the local output component further comprises a second lens group, wherein the second lens group is configured to: receive L light beams emitted by the second optical component at different angles, convert the L light beams into L light beams parallel to each other, and make the parallel L light beams incident to the output ports of the local output component.

15. The apparatus according to claim 13, wherein the local output component further comprises a second planar optical waveguide component connected to the L output ports, wherein the second planar optical waveguide component is configured to: receive L light beams emitted by the second optical component at different angles, and output the L light beams to the output ports of the local output component.

16. The apparatus according to claim 13, wherein the K output components further comprise a line output component having one output port, wherein the line output component is configured to output a received light beam to a line side, and the line output component and the local output component are arranged in an alternating mode.

17. The apparatus according to claim 13, wherein each input port in the M input components is connected to an input optical fiber, and a light beam transmitted in the input optical fiber is incident to the first optical component through the input port.

18. The apparatus according to claim 17, wherein the first optical component comprises a third lens group, a first dispersion element, and a fourth lens group, wherein the third lens group is configured to: redirect an incident light beam, and make the light beam incident to the first dispersion element; the first dispersion element is configured to disperse each incident light beam to obtain light sub-beams corresponding to wavelengths; and the fourth lens group is configured to converge, to the first switch array, the incident light sub-beams corresponding to the wavelengths, wherein light sub-beams corresponding to a same wavelength are converged on a column of switch units that are in the first switch array and that are corresponding to the wavelength.

19. The apparatus according to claim 17, wherein the second optical component comprises a seventh lens group, a second dispersion element, and an eighth lens group, wherein the seventh lens group is configured to: redirect a light sub-beam that is corresponding to each wavelength and that is emergent from the second switch array, and make the light sub-beam incident to the second dispersion element; the second dispersion element is configured to combine, into one light beam, light sub-beams that are in an incident light beam and that are corresponding to each output port; and the eighth lens group is configured to make a light beam that is in an incident light beam and that is corresponding to each output port incident to a corresponding output port.

20. A wavelength switching system, wherein the system comprises M line selection components, K line receiving components, and at least two wavelength switching apparatuses, wherein both M and K are positive integers greater than or equal to 1;

each of the M line selection components is configured to allocate a received optical signal to a corresponding input component in each of the at least two wavelength switching apparatuses for input;

each of the at least two wavelength switching apparatuses is configured to switch any wavelength in a light beam input by any input component of the wavelength switching apparatus, based on specified wavelength routing information to an output component that is corresponding to any wavelength and that is in the wavelength switching apparatus for output; and each of the K line receiving components is configured to obtain an output optical signal based on a light beam output by a corresponding output component of each of the at least two wavelength switching apparatuses;

wherein each of the wavelength switching apparatuses comprises: M input components, a first optical component, a first switch array, a second switch array, a second optical component, and K output components, wherein the first switch array and the second switch array each comprise a plurality of rows of switch units, and both M and K are positive integers greater than or equal to 1;

at least one of the M input components is a local input component, the local input component is configured to receive a light beam added through an input port of the local input component, the local input component comprises N input ports, N is a positive integer greater than or equal to 1, and each input component is configured to make a light beam input through an input port of the input component, incident to the first optical component;

the first optical component is configured to converge, to a row of switch units that are in the first switch array and that are corresponding to each input component, a light beam incident from the input component;

each row of switch units in the first switch array are configured to deflect a light sub-beam that is corresponding to each wavelength and that is in a light beam incident to the row of switch units, to a row of switch units that are in the second switch array and that are corresponding to an output component configured to output the light sub-beam;

each row of switch units in the second switch array are configured to: deflect, based on a spatial location of an output component corresponding to the row of switch units, a light sub-beam that is corresponding to each wavelength and that is in a light beam incident to the row of switch units, and make the light sub-beam incident to the second optical component;

the second optical component is configured to redirect, to an output component corresponding to each row of switch units in the second switch array, a light beam emergent from the row of switch units; and each of the K output components is configured to couple a light beam output by the output component into an output port for output.

* * * * *